US012715736B2

(12) United States Patent
Martí Sánchez

(10) Patent No.: US 12,715,736 B2
(45) Date of Patent: Aug. 25, 2026

(54) ELEVATOR SAFETY DEVICE

(71) Applicant: OTIS ELEVATOR COMPANY, Farmington, CT (US)

(72) Inventor: Luis Martí Sánchez, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/959,857

(22) Filed: Nov. 26, 2024

(65) Prior Publication Data

US 2025/0206571 A1 Jun. 26, 2025

(30) Foreign Application Priority Data

Dec. 21, 2023 (EP) .................................... 23383349

(51) Int. Cl.
*B66B 5/18* (2006.01)
*B66B 5/16* (2006.01)

(52) U.S. Cl.
CPC . *B66B 5/18* (2013.01); *B66B 5/16* (2013.01)

(58) Field of Classification Search
CPC ................ B66B 5/18; B66B 5/16; B66B 5/22
See application file for complete search history.

(56) References Cited

U.S. PATENT DOCUMENTS 4,512,444 A * 4/1985 Koppensteiner .......... B66B 5/28 188/41
4,538,706 A 9/1985 Koppensteiner
5,002,158 A * 3/1991 Ericson ..................... B66B 5/04 187/314
7,398,863 B2 * 7/2008 Liebetrau .................. B66B 5/18 187/372
(Continued)

FOREIGN PATENT DOCUMENTS

CN 116281489 A * 6/2023 ............... B66B 5/18
GB 1148742 A * 4/1969 ............. B66F 17/00
(Continued)

*Primary Examiner* — Minh Truong
*Assistant Examiner* — Michelle M Mudwilder
(74) *Attorney, Agent, or Firm* — Carlson, Gaskey & Olds, P.C.

(57) ABSTRACT

An elevator safety device comprises a housing attachable to an elevator car or to an elevator counterweight of an elevator system, the housing comprising a passage for allowing a guide member to pass through. A brake shoe is attached to the housing and is located on a first side of the guide member passing through the passage. A spring assembly is arranged on a second of side of the guide member and comprises at least one leaf spring, the spring assembly having a fixed end, which is fixed to the housing, and an opposite free end, which is not fixed to the housing. The spring assembly extends at an angle with respect to the guide member, defining a tapered region between the guide member and the spring assembly, wherein the free end of the spring assembly is arranged closer to the guide member than the fixed end of the spring assembly. A roller is, at least in an activated condition of the elevator safety device, located within the tapered region defined by the spring assembly and the guide member. The roller is capable of moving along the spring assembly towards the free end of the spring assembly into a wedged condition between the spring assembly and the guide member.

22 Claims, 5 Drawing Sheets

(56) References Cited

U.S. PATENT DOCUMENTS

| | | | | |
|---|---|---|---|---|
| 9,821,983 | B2 | 11/2017 | Billard et al. | |
| 10,421,640 | B2 * | 9/2019 | Fargo | B66B 5/22 |
| 2020/0207581 | A1 * | 7/2020 | Sotoca | B66B 7/046 |
| 2020/0354192 | A1 * | 11/2020 | Sotoca | B66B 5/16 |
| 2022/0177272 | A1 | 6/2022 | Blochle et al. | |

FOREIGN PATENT DOCUMENTS

| | | | | |
|---|---|---|---|---|
| KR | 20030093946 | A * | 12/2003 | |
| WO | WO-0073193 | A1 * | 12/2000 | B66B 5/22 |

* cited by examiner

ELEVATOR SAFETY DEVICE

CROSS-REFERENCE TO RELATED APPLICATION

This application is a U.S. non-provisional application claiming the benefit of European Application No. 23383349.0, filed on Dec. 21, 2023, which is incorporated herein by reference in its entirety.

TECHNICAL FIELD

The disclosure relates to an elevator safety device. The disclosure further relates to an elevator car, to an elevator counterweight, and to an elevator system respectively comprising an elevator safety device, and to a method of activating an elevator safety device.

BACKGROUND

An elevator system typically comprises at least one elevator car, which is configured for moving along a hoistway extending between a plurality of landings, and a driving member, which is configured for driving the elevator car. The elevator system may further include an elevator counterweight moving concurrently and in opposite direction with respect to the elevator car. An elevator system usually comprises at least one elevator safety device that is configured for braking the movement of the elevator car and/or the elevator counterweight relative to a guide member, such as a guide rail, in certain situations, for example when the movement of the elevator car and/or of the elevator counterweight exceeds a predetermined speed and/or acceleration. An elevator safety device usually includes at least one engagement member that is configured for engaging with the guide member for braking the movement of the elevator safety device along the guide member, when the elevator safety device is activated.

Currently available elevator safety devices have a relatively large size, in particular a relatively long extension in the moving direction along the guide member.

SUMMARY

An improved elevator safety device for an elevator system is provided, which may have smaller dimensions, in particular a smaller dimension in the moving direction along the guide member.

According to an exemplary embodiment of the disclosure, an elevator safety device comprises a housing, which is configured for being attached to an elevator car or to an elevator counterweight. The housing comprises a passage for allowing an elevator guide rail to pass through. The elevator safety device further comprises a brake shoe attached to the housing and located on a first side of the elevator guide rail passing through the passage; and a spring assembly arranged on a second of side of the guide rail passing through the passage and comprising at least one leaf spring. The spring assembly has a fixed end, which is fixed to the housing, and an opposite free end, which is not fixed to the housing. The spring assembly extends at an angle with respect to the guide rail, defining a tapered region between the guide rail and the spring assembly, wherein the free end of the spring assembly is arranged closer to the guide rail than the fixed end of the spring assembly. The elevator safety device further comprises a roller. At least in an activated condition of the elevator safety device, the roller is located within the tapered region defined by the spring assembly and the guide rail. The roller is further capable of moving along the spring assembly towards the free end of the spring assembly into a wedged condition between the spring assembly and the guide rail.

Exemplary embodiments of the disclosure also include a method of activating an elevator safety device according to an exemplary embodiment of the disclosure, wherein the method includes: moving the roller towards the guide rail so that the roller is sandwiched between the guide rail and the spring assembly; the roller is moved due to frictional engagement with the guide rail towards the free end of the spring assembly, when the elevator safety device moves along the guide rail; and the roller elastically bends the free end of the spring assembly away from the guide rail.

Providing the spring assembly with a free end, which is not fixed to the housing so that it is movable with respect to the housing, allows for reducing the length of the spring assembly in the longitudinal direction. In consequence, the elevator safety device may have a smaller size, in particular a smaller dimension in the moving direction along the guide member.

As a result, the weight, the amount of necessary materials and the costs of the elevator safety device may be reduced.

A number of optional features of an elevator safety device according to exemplary embodiment of the disclosure are set out in the following. These features may be realized in particular embodiments, alone or in combination with any of the other features, unless explicitly stated otherwise.

A portion of the spring assembly, which is adjacent to the free end of the spring assembly, may be configured for being elastically bent away from the guide rail by the roller, as the roller moves towards the free end of the spring assembly. In such a configuration, the bent spring assembly exerts an elastic force onto the roller, pressing the roller elastically against the guide rail. This results in generating an braking force for reliably braking the movement of the elevator safety device with respect to the guide rail.

The elevator safety device may comprise at least one support member, which is configured for supporting a portion of the spring assembly and/or for limiting the bending of the spring assembly caused by the roller. Providing such a support member may prevent the spring assembly from excessively bending. An excessive bending of the spring assembly could result in damaging or even destroying the spring assembly. An excessive bending of the spring assembly could further prevent the spring assembly from providing a sufficiently large braking force, i.e. a braking force that is large enough for ensuring a secure braking of the elevator car or of the elevator counterweight, respectively.

The elevator safety device may comprise a plurality of supports. The plurality of supports may be arranged along a longitudinal extension of the spring assembly. The plurality of supports may define a bending contour of the spring assembly. This may allow enhancing the braking capabilities of the elevator safety device.

The elevator safety device may comprise at least one elongated support member, which extends over an elongated portion of the spring assembly and defines a bending contour of the spring assembly. The at least one support member may in particular be an at least partially curved support member, defining a curved bending contour.

The at least one support member may have a continuous or smooth contour. Alternatively, the at least one support member may have a contour comprising at least one kink.

The elevator safety device may comprise a fixture, which is configured for fixing the fixed end of the spring assembly to the housing. The fixture may be configured for accommodating the fixed end of the spring assembly. The fixture may be configured for fixing the spring assembly by employing fixing elements, such as screws or bolts, extending through the spring assembly. Alternatively, the fixture may be configured for fixing the spring assembly by clamping, soldering, welding or adhesive bonding. Alternatively, restricting movement of the spring end can be achieved by having restraining forces in the housing. Additionally, the fixed end feature may have some clearances with the spring, to facilitate the assembly.

The fixture may be attached to the housing. Alternatively, the fixture may be provided by and/or formed integrally with a portion of the housing. Forming the fixture integrally with the housing may facilitate the manufacturing of the elevator safety device, as the manufacturing steps of producing a separate fixture and attaching the separately produced fixture to the housing may be omitted.

The spring assembly may comprise a plurality of leaf springs. The plurality of leaf springs may, in particular, be arranged in a sandwich-structure on top of each other forming a stack of leaf springs. A plurality of leaf springs, in particular a plurality of leaf springs arranged in a sandwich-structure, provide a strong spring assembly, which is capable of reliably providing sufficiently large braking forces.

The spring assembly may have a length of not more than 60 mm. The spring assembly may in particular have a length in the range of between 54 mm and 58 mm. Spring assemblies having a length in this range have been found as reliably providing sufficiently large braking force, and, simultaneously allow reducing the dimensions of the elevator safety device. These are just examples, and it should be understood that the spring length can be varied based on loading and other various operational requirements.

The spring assembly of the support member depends on its length and on the load the elevator safety device is designed for.

If the spring assembly consists of a single leaf spring, it may, for example, have a thickness at its thinnest point, which is in the range of between 3 mm and 5 mm. A spring assembly, which is designed for heavier loads and which is formed as a stack comprising a plurality of leaf springs, may, for example, have a total thickness of more than 15 mm. These are just examples, and it should be understood that the spring thickness can be varied based on loading and other various operational requirements.

A groove may be formed within a surface of the spring assembly facing the guide rail, and a collar may be formed on a circumferential peripheral surface of the roller. Said collar may be received within the groove formed within a surface of the spring assembly to avoid contact between the knurling of the roller (e.g., collar) and the spring. Alternatively, knurling may not be required. The purpose of knurling is to increase friction between the roller and spring; however, this can be achieved in other ways such as by providing an adequate surface finishing or a coating.

The elevator safety device may further comprise a stopper, which is located in the vicinity of the free end of the spring assembly. The stopper may be configured for preventing the roller from moving beyond the free end of the spring assembly.

The stopper may be attached to and supported by the housing. Alternatively, the stopper may be formed integrally with the housing, i.e. as a portion of the housing. Forming the stopper integrally with the housing may facilitate the manufacturing of the elevator safety device, as the manufacturing steps of producing a separate stopper and attaching the separately produced stopper to the housing may be omitted.

Exemplary embodiments of the disclosure further include an elevator car and an elevator counterweight respectively comprising at least one elevator safety device according to an exemplary embodiment of the disclosure.

An elevator car and/or an elevator counterweight according to an exemplary embodiment of the disclosure may include a first elevator safety device according to an exemplary embodiment of the disclosure and a second elevator safety device according to an exemplary embodiment of the disclosure.

In the first elevator safety device, the fixed end of the spring assembly may be a lower end of the spring assembly facing towards the floor of the hoistway, and the free end of the spring assembly may be an upper end of the spring assembly facing towards an upper end of the hoistway.

In the second elevator safety device, the free end of the spring assembly may be a lower end of the spring assembly facing towards the floor of the hoistway, and the fixed end of the spring assembly may be an upper end of the spring assembly facing towards an upper end of the hoistway.

Such a combination of the first and second elevator safety devices allows braking the movement of the elevator car or of the elevator counterweight in both moving directions, i.e. an upward movement and a downward movement, along the guide member.

Exemplary embodiments of the disclosure also include an elevator system comprising at least one guide member and at least one elevator car and/or at least one elevator counterweight traveling along said at least one guide member, wherein said at least one elevator car and/or at least one elevator counterweight comprise at least one elevator safety device according to an exemplary embodiment of the disclosure.

BRIEF DESCRIPTION OF THE DRAWINGS

In the following, exemplary embodiments of the disclosure are described in more detail with respect to the enclosed figures.

DETAILED DESCRIPTION

Figure 1:
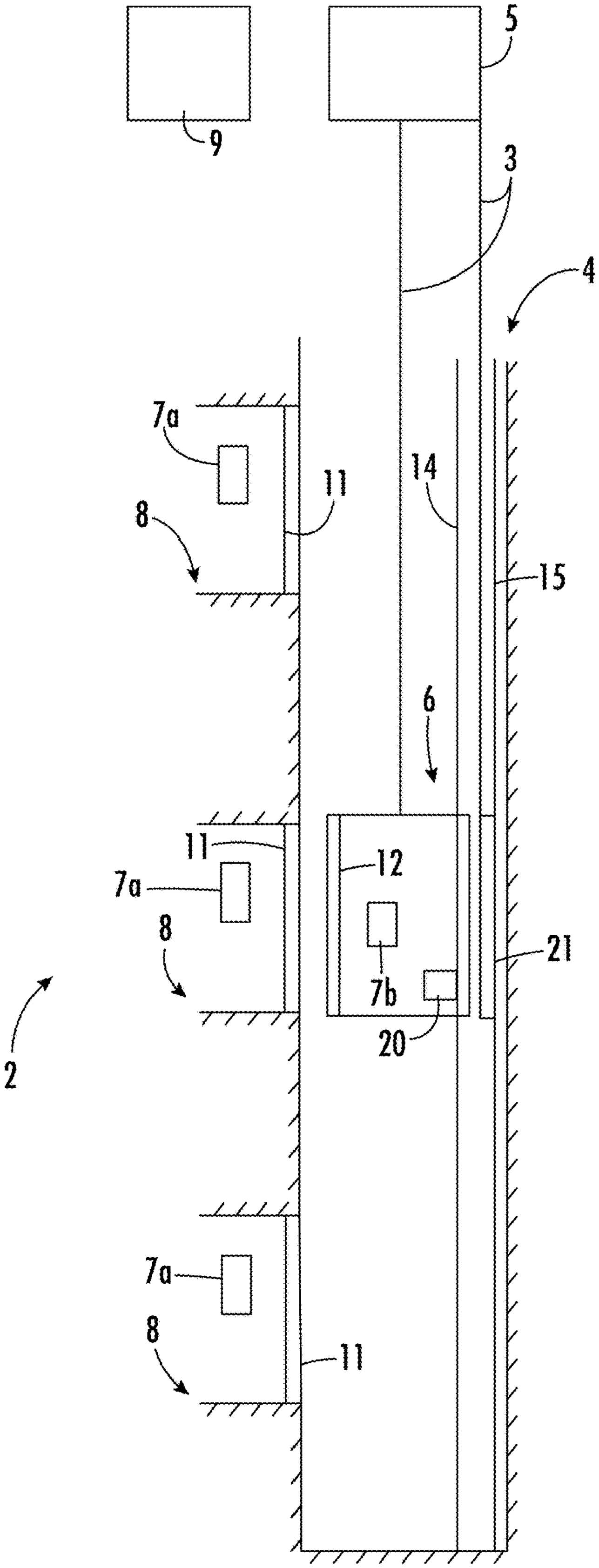
FIG. 1 schematically depicts an elevator system according to an exemplary embodiment of the disclosure.

The elevator system 2 comprises a hoistway 4 extending in a vertical direction between a plurality of landings 8, which are located on different floors. The elevator system 2 includes an elevator car 6, which is arranged within the hoistway 4 for being moved between the plurality of landings 8. The elevator car 6 is movable in particular along a plurality of car guide members 14, such as guide rails, extending along the vertical direction of the hoistway 4. Only one of said car guide members 14 is visible in FIG. 1. Although only a single elevator car 6 is depicted in FIG. 1, exemplary embodiments of the disclosure may include elevator systems 2 comprising a plurality of elevator cars 6 moving in one or more hoistways 4.

The elevator car 6 is movably suspended by way of a tension member 3. The tension member 3 is coupled to an elevator drive 5, which is configured for driving the tension member 3 in order to move the elevator car 6 along the height of the hoistway 4 between the plurality of landings 8. The elevator drive 5 is controlled by an elevator system controller 9.

The tension member 3 may be a rope, e.g. a steel cord, or a belt. The tension member 3 may be uncoated. Alternatively, the tension member 3 may be coated with a coating, e.g. with a coating having the form of a polymer jacket. In a particular embodiment, the tension member 3 may be a belt comprising a plurality polymer coated steel cords (not shown). The elevator system 2 may have a traction drive including a traction sheave for driving the tension member 3.

The exemplary embodiment shown in FIG. 1 uses a 1:1 roping for suspending the elevator car 6. The skilled person, however, easily understands that the type of the roping is not essential for the disclosure and that different kinds of roping, e.g. a 2:1 roping or a 4:1 roping may be used as well.

The elevator system 2 depicted in FIG. 1 also includes an elevator counterweight 21. The elevator counterweight 21 is attached to the tension member 3 opposite to the elevator car 6 and configured to move along at least one counterweight guide member 15. The disclosure may be applied similarly to elevator systems 2 which do not comprise an elevator counterweight 21.

In an alternative configuration, which is not shown in the figures, the elevator system 2 may be an elevator system 2 without a tension member 3. Instead, the elevator system 2 may include, for example, a hydraulic drive or a linear drive. The elevator system 2 may have a machine room, which is not shown in FIG. 1, or it may be a machine room-less elevator system.

Each landing 8 is provided with a landing door 11, and the elevator car 6 is provided with a corresponding elevator car door 12 for allowing passengers to transfer between a landing 8 and the interior of the elevator car 6, when the elevator car 6 is positioned at the respective landing 8.

Input to the elevator system controller 9 may be provided via landing control panels 7*a*, which are provided on every landing 8, in particular in the vicinity of the landing doors 11, and/or via an elevator car control panel 7*b*, which is provided inside the elevator car 6.

The landing control panels 7*a* may comprise elevator hall call buttons and/or destination call buttons. Destination call buttons allow passengers to enter their respective destinations before entering the elevator car 6. In case the landing control panels 7*a* are equipped with elevator hall call buttons, no elevator car control panel 7*b* needs to be provided inside the elevator car 6, since the elevator system 2 is fully controlled by the commands input via the landing control panels 7*a*.

The landing control panels 7*a* and the elevator car control panel 7*b* may be connected to the elevator system controller 9 with electrical wiring, which are not shown in FIG. 1, in particular by an electric bus, or with wireless data connections.

The elevator car 6 is equipped with at least one elevator safety device 20, which is schematically illustrated at the elevator car 6 in FIG. 1.

The elevator safety device 20 is operable to brake or at least assist in braking, i.e. slowing or stopping the movement of, the elevator car 6 by engaging with the at least one car guide member 14.

Alternatively or additionally, the elevator counterweight 21 may be equipped with at least one elevator safety device 20, which is configured for engaging with the at least one counterweight guide member 15. For sake of simplicity of the illustration, the elevator counterweight 21 depicted in FIG. 1 is not equipped with an elevator safety device 20.

Figure 2:
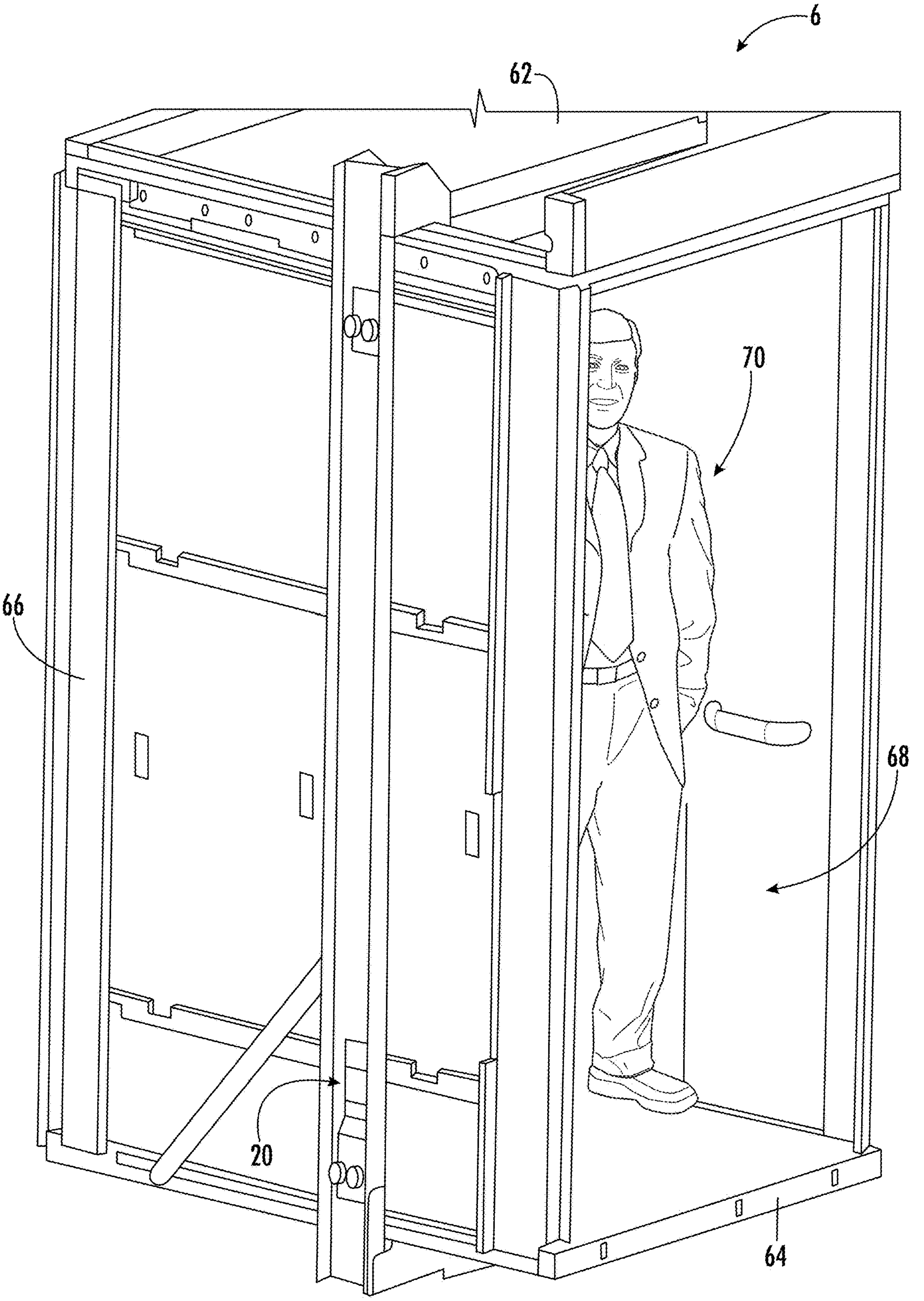
FIG. 2 shows a perspective view of an elevator car according to an exemplary embodiment of the disclosure.

FIG. 2 is an enlarged view of an elevator car 6 according to an exemplary embodiment of the disclosure. The elevator car 6 includes a car roof 62, a car floor 64 and a plurality of car side walls 66. In combination, the car roof 62, the car floor 64 and the plurality of side walls 66 define an interior space 68 of the elevator car 6 for accommodating and carrying passengers 70 and/or cargo. For sake of simplicity of the illustration, cargo is not shown in FIG. 2.

An elevator safety device 20 according to an exemplary embodiment of the disclosure is attached to a side wall 66 of the elevator car 6.

Although only a single elevator safety device 20 is depicted in FIGS. 1 and 2, respectively, the skilled person will understand that a single elevator car 6 and a single elevator counterweight 21 may be equipped with a plurality of safety devices 20, respectively.

In particular, in a configuration, in which the elevator system 2 comprises a plurality of car guide members 14, each elevator car 6 may be equipped with a plurality of elevator safety devices 20. Each of the plurality of elevator safety devices 20 may be associated with one of the car guide members 14, respectively.

Similarly, in a configuration, in which the elevator system 2 comprises a plurality of counterweight guide members 15, each elevator counterweight 21 of the elevator system 2 may be equipped with a plurality of elevator safety devices 20. Each elevator safety device 20 may be associated with one of the counterweight guide members 15, respectively.

Alternatively or additionally, two or more elevator safety devices 20 may be provided on top of each other at the same sidewall 66 of the elevator car 6 or of the elevator counterweight 21 in order to engage with the same guide member 14, 15.

A safety device 20 is usually operable for braking its movement with respect to the guide member 14, 15 in only one direction. The elevator car 6 and/or the elevator counterweight 21 may therefore be equipped with at least two elevator safety devices 20, which are configured for braking the movement with respect to the guide member 14, 15 in opposite directions.

The at least two elevator safety devices 20 may in particular include a first elevator safety device 20, which is configured for braking a downward movement of the elevator car 6/elevator counterweight 21 with respect to the guide member 14, 15; and a second elevator safety device 20, which is configured for braking an upward movement of the elevator car 6/elevator counterweight 21 with respect to the guide member 14, 15.

In the following, the structure and the operating principles of an elevator safety device 20 according to an exemplary embodiment of the disclosure will be described with reference to FIGS. 3 to 6.

Figure 3A:
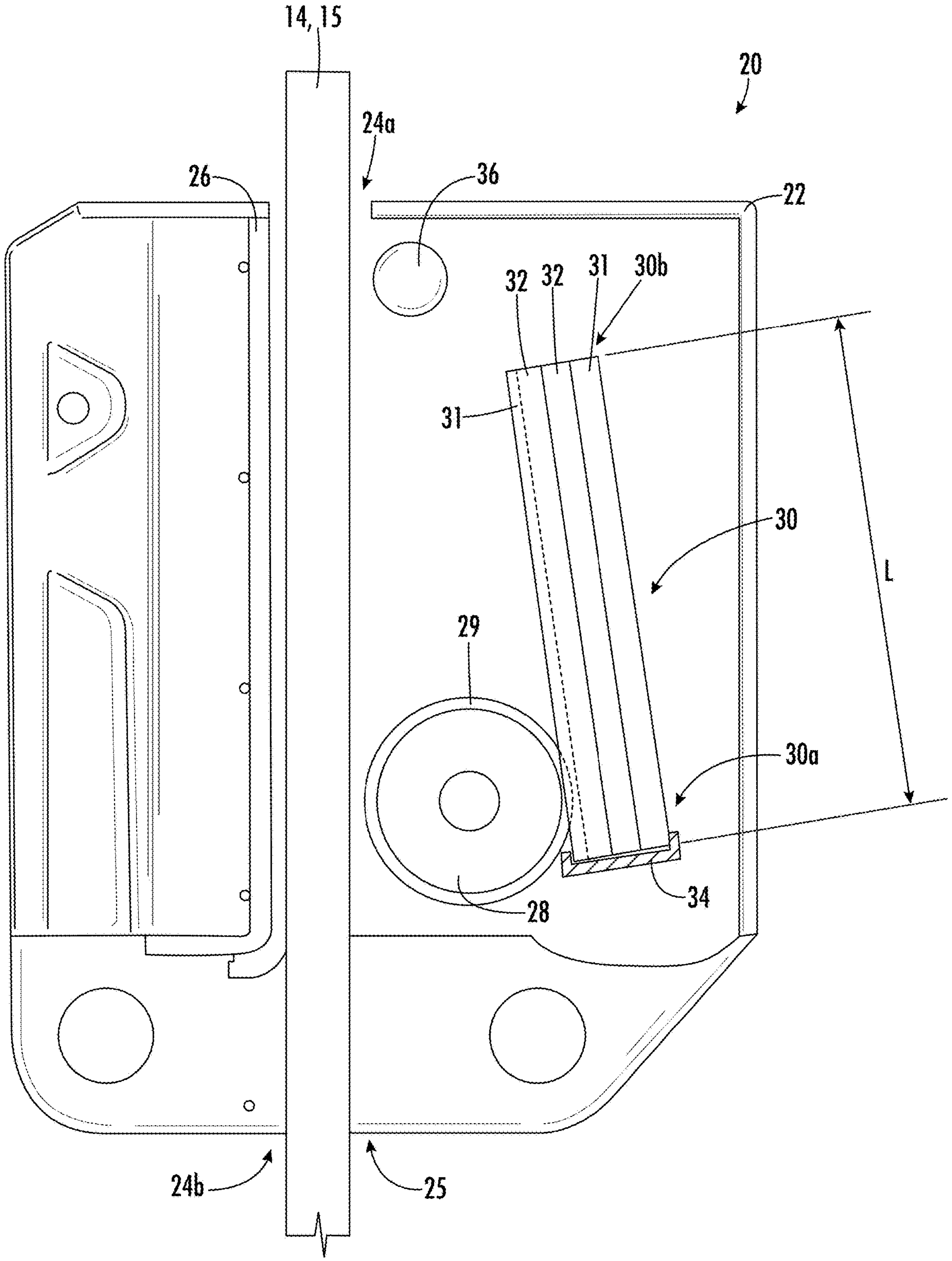
FIG. 3A depicts a schematic plan view of an elevator safety device according to an exemplary embodiment of the disclosure in a deactivated standby state.
Figure 3B:
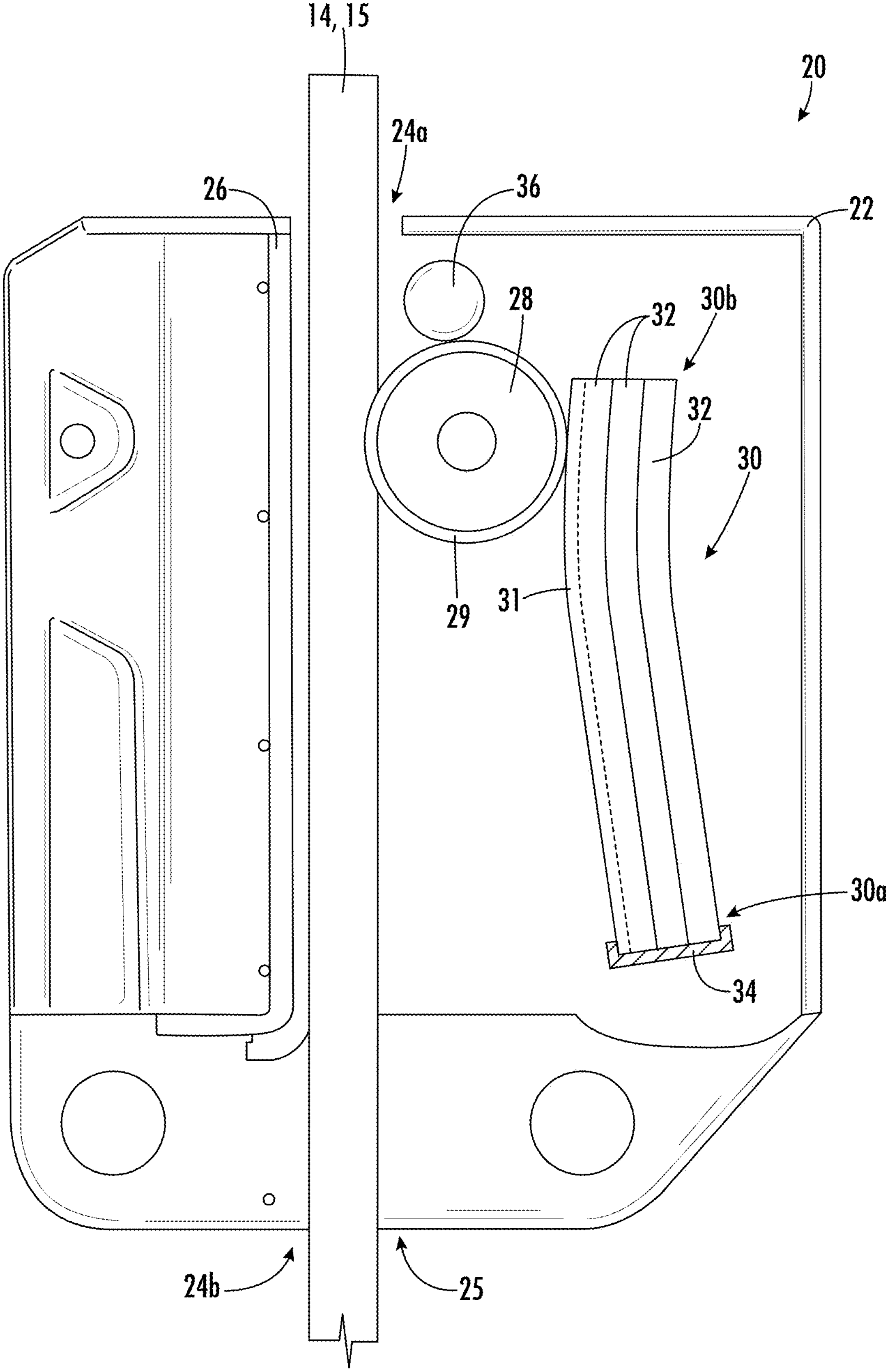
FIG. 3B depicts a schematic plan view of the elevator safety device depicted in FIG. 3A in an activated state.

FIG. 3A depicts a schematic plan view of an elevator safety device 20 according to an exemplary embodiment of the disclosure in a deactivated standby state. FIG. 3B depicts the elevator safety device depicted in FIG. 3A in an activated state.

The elevator safety device 20 comprises a housing 22. When the elevator safety device 20 is installed within an elevator system 2, the housing 22 is closed, e.g., by a cover plate, which is not shown in the figures. In FIGS. 3A and 3B, the housing 22 is depicted in an open state without the cover plate, in order to allow showing the internal structure of the elevator safety device 20.

A first opening 24*a* is formed in a top portion of the housing 22, and a second opening 24*b* is formed in a bottom portion of the housing 22. The two openings 24*a*, 24*b* provide a passage 25 extending through the elevator safety device 20, which allows an elevator guide member 14, 15 to pass through the elevator safety device 20.

The elevator safety device 20 comprises a first engagement member 26, in particular a brake shoe 26, and a second engagement member 28, which is provided as a roller 28.

The first and second engagement members 26, 28 are arranged opposite to each other with a gap formed in between. The gap is part of the passage 25 extending through the elevator safety device 20, and it is configured for accommodating a portion of a guide member 14, 15 of the elevator system 2 extending in a longitudinal direction, in particular in a vertical direction.

The first engagement member/brake shoe 26 is supported by the housing 22 on a first side of the elevator guide member 14, 15 passing through the elevator safety device 20.

The second engagement member/roller 28 is arranged on a second of side of the guide member 14, 15 passing through the elevator safety device 20, so that the guide member 14, 15 extends through the elevator safety device 20 between the first and second engagement members 26, 28. The roller 28 is capable to roll along the longitudinal extension of the guide member 14, 15.

The elevator safety device 20 further comprises a spring assembly 30, which is arranged on the second of side of the guide member 14, 15.

The spring assembly 30 comprises at least one leaf spring 32. Optionally, the spring assembly 30 may comprise a plurality of leaf springs 32. The spring assembly 30 may in particular comprise a plurality of leaf springs 32 that are arranged in a sandwich structure on top of each other forming a stack of lead springs 32.

The spring assembly 30 may have a length L of not more than 60 mm. The spring assembly 30 may in particular have a length of 54 mm to 58 mm. These are just examples, and it should be understood that the spring length can be varied based on loading and other various operational requirements The thickness of the spring assembly 30 depends on its length and on the load the elevator safety device 2 is designed for.

If the spring assembly 30 consists of a single leaf spring 32, it may, for example, have a thickness at its thinnest point, which is in the range of between 3 mm and 5 mm.

A spring assembly 30, which is designed for heavier loads and which is formed as a stack comprising a plurality of leaf springs 32, may, for example, have a total thickness of more than 15 mm. These are just examples, and it should be understood that the spring thickness can be varied based on loading and other various operational requirements The spring assembly 30 has a fixed end 30*a*, which is fixed to the housing 22, and an opposite free end 30*b*, which is not fixed to the housing 22, so that it is movable with respect to the housing 22.

The elevator safety device 20 may include a fixture 34, which is configured for fixing the fixed end 30*a* of the spring assembly 30 to the housing 22. The fixture 34 may be mounted to the housing 22. Alternatively, the fixture 34 may be formed integrally with the housing 22.

The spring assembly 30 may be fixed within the fixture 34 by fixing elements, which are not shown in FIG. 3. Such fixing elements may include screws or bolts, extending through the spring assembly 30. The spring assembly 30 may also be fixed to the fixture 34 by clamping, soldering, welding or adhesive bonding.

The spring assembly 30 extends at an angle with respect to the guide member 14, 15, defining a tapered region between the guide member 14, 15 and the spring assembly 30. The free end 30*b* of the spring assembly 30 is arranged closer to the guide member 14, 15 than the fixed end 23*b* of the spring assembly 30.

The spring assembly 30 may, for example, be arranged at an angle in the range of between 3° and 15° with respect to the guide member 14, 15. However, other angles could also be used as need to accommodate other configurations.

The roller 28 is movably arranged within the tapered region defined by the guide member 14, 15 and the spring assembly 30.

When the elevator safety device 20 is in a standby configuration, as it is depicted in FIG. 3A, in which the elevator safety device 20 is not activated, the roller 28 is located in a standby position, in which it does not contact the guide member 14, 15. In the standby configuration, the elevator safety device 20 and, in consequence, an elevator car 6 or an elevator counterweight 21, to which the elevator safety device 20 is mounted, are capable to move freely along the guide member 14.

The standby position of the roller 28 may, in particular, be in the vicinity to the fixed end 23*b* of the spring assembly 30, as it is illustrated by the roller 28 depicted in FIG. 3A.

For activating the elevator safety device 20, the roller 28 is moved towards the guide member 14, 15 by an activation mechanism, which is not depicted in the figures.

The roller 28 contacting the guide member 14, 15 results in a frictional engagement between the roller 28 and the guide member 14, 15. As a result of said frictional engagement, a downward movement of the elevator safety device 20 with respect to the guide member 14, 15 causes the roller 28 to roll along the guide member 14, 15 on one side (the left side of the roller in FIGS. 3A and 3B) and to roll upwards along the spring assembly 30 on the other side (the right side of the roller 28 in FIGS. 3A and 3B).

Due to the inclined orientation of the spring assembly 30 with respect to the guide member 14, 15, this movement of the roller 28 causes the roller 28 to move into a wedged condition, in which the roller 28 is sandwiched between the guide member 14, 15 and the spring assembly 30, as illustrated in FIG. 3B.

In said wedged condition, the roller 28 presses against the guide member 14, 15, generating a braking force between the guide member 14, 15 and the brake shoe 26 of the elevator safety device 20. Said braking force brakes the movement of the elevator safety device 20 with respect to the guide member 14, 15, until said movement has been stopped.

Optionally, a groove 31 may be formed within a surface of the spring assembly 30 facing the guide member 14, 15, and a corresponding collar 29 may be formed on the circumferential surface of the roller 28. The collar 29 formed on the roller 28 may be received within the groove 31, which is formed within the surface of the spring assembly 30 to avoid contact between the knurling of the roller (e.g., collar) and the spring. Alternatively, knurling may not be required. The purpose of knurling is to increase friction between the roller and spring; however, this can be achieved in other ways such as by providing an adequate surface finishing or a coating.

The elevator safety device 20 may further comprise a stopper 36, which is located in the vicinity of the free end 30*b* of the spring assembly 30, and which is configured for preventing the roller 28 from moving beyond the free end 30*b* of the spring assembly 30.

The stopper 36 may be attached to and supported by the housing 22. The stopper 36 may also be formed integrally with the housing 22, i.e. as a portion of the housing 22.

The elevator safety device 20 depicted in FIGS. 3A and 3B is configured for braking a downward movement of the elevator safety device 20 with respect to the guide member 14, 15.

An elevator safety device 20, which is configured for braking an upward movement of the elevator safety device 20 with respect to the guide member 14, 15, would be oriented in an upside down orientation with respect to the orientation depicted in FIGS. 3A and 3B, i.e. in an orientation, in which the fixed end 30*a* of the spring assembly 30 is oriented towards the top and the free end 30*b* of the spring assembly 30, which is closer to the guide member 14, 15 than the fixed end 30*a*, is oriented towards the bottom.

When the roller 28 rolls along the spring assembly 30, as it has been described before, the force exerted by the roller 28 onto the spring assembly 30 deforms the spring assembly 30 in a lateral direction, i.e. in a direction which is oriented transversely, in particular perpendicularly, to the longitudinal extension of the spring assembly 30.

The force, which is exerted by the roller 28 onto the spring assembly 30, may in particular bend the free end 32*b* of the spring assembly 30 elastically away from the guide member 14, 15, as it is depicted in FIG. 3B. In consequence, an elastic reactive force of the spring assembly 30 is generated, which presses the roller 28 elastically against the guide member 14, 15, when the roller 28 moves towards the free end 32*b* of the spring assembly 30.

The elevator safety device 20 may comprise a support structure for supporting at least a portion of the spring assembly 30 and/or for limiting the bending of the spring assembly 30 caused by the roller 28.

Figure 4:
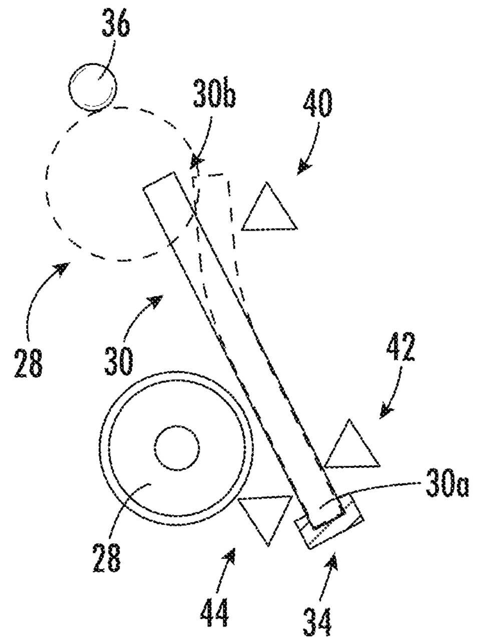
FIG. 4 schematically depicts a support structure according to an exemplary embodiment of the disclosure.
Figure 5:
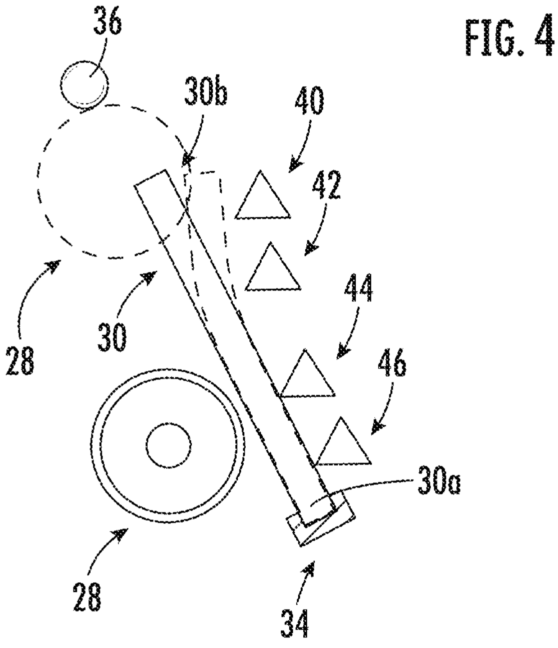
FIG. 5 schematically depicts a support structure according to another exemplary embodiment of the disclosure.
Figure 6:
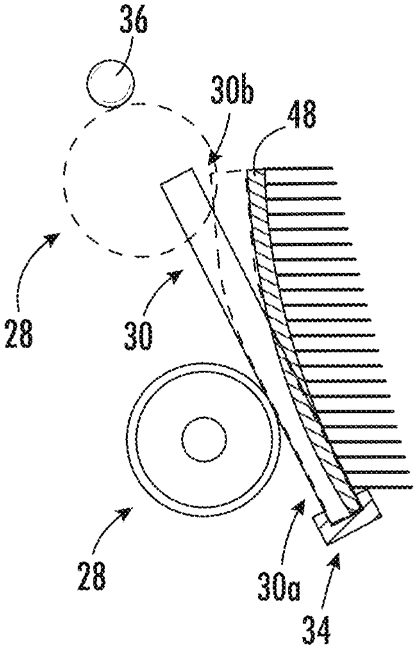
FIG. 6 schematically depicts a support structure according to yet another exemplary embodiment of the disclosure.

Possible configurations of such support structures are schematically illustrated in FIGS. 4 to 6. In order to enhance the clarity of the illustration, only the most essential components of the elevator safety device 20 are schematically depicted in FIGS. 4 to 6. The skilled person understands that these components belong to an elevator safety device 20 as it is depicted in FIG. 3.

In FIGS. 4 to 6, the deactivated stationary configuration of the elevator safety device 20 is depicted by solid lines, and the activated configurations of the roller 28 and the spring assembly 30 are depicted by dashed lines.

It its noted that the support structures depicted in FIGS. 4 to 6 are shown only exemplarily. In other words, the support structures, which may be employed in elevator safety devices 20 according to exemplary embodiments of the disclosure, are not restricted to the support structure shown in FIGS. 4 to 6. Elevator safety devices 20 according to exemplary embodiments of the disclosure may include further support structures, which are not explicitly depicted in the figures.

FIG. 4 depicts a support structure according to an exemplary embodiment of the disclosure. In the embodiment depicted in FIG. 4, the first support member 40 is arranged in the vicinity of the free end 30*b* of the spring assembly 30 on the side facing away from the roller 28.

The first support member 40 does not securely fix the free end 30*b* of the spring assembly 30 to the housing 22. Instead, the first support member 40 is arranged in some distance from the free end 30*b* of the spring assembly 30. The distance between the first support member 40 and the free end 30*b* of the spring assembly 30 allows the free end 30*b* of the spring assembly 30 to bent away from the guide member 14, 15, when the roller 28 is moved into its wedged position in the vicinity of the free end 30*b* of the spring assembly 30, as it is illustrated by the dashed lines in FIG. 4.

Optionally, a second support member 42 may be provided on the same side of the spring assembly 30 as the first support member 40. The second support member 42 may be arranged at a position in between the first support member 40 and the fixed end 30*a* of the spring assembly 30, in particular in the vicinity of the fixed end 30*a* of the spring assembly 30, in order to restrict the bending of the spring assembly 30.

Alternatively or additionally to the second support member 42, a third support member 44 may be provided on the same side of the spring assembly 30 as the roller 28, i.e. on the side of the spring assembly 30, which is opposite to side on which the first support member 40 is arranged.

Providing two or more support members 40, 42, 44 along the longitudinal direction of the spring assembly 30 for restricting the bending of different portions of the spring assembly 30 may allow for defining a bending contour, in particular a curved bending contour, of the spring assembly 30. Defining a bending contour of the spring assembly 30 may allow adjusting the elastic properties of the spring assembly 30. In other words, defining a bending contour of the spring assembly 30 may allow adjusting the forces, which are exerted by the spring assembly 30 onto the roller 28, when the roller 28 moves from its starting position in the vicinity of the fixed end 30*a* of the spring assembly 30 into its wedged position in the vicinity of the free end 30*b* of the spring assembly 30.

An exemplary embodiment of a support structure comprising a plurality of support members 40, 42, 44 defining a curved bending contour of the spring assembly 30 is schematically depicted in FIG. 5.

The support structure may also comprise at least one elongated support member 48, which extends along an elongated portion of the spring assembly 30.

An exemplary embodiment of a support structure comprising such an elongated support member 48 is depicted in FIG. 6. In the embodiment depicted in FIG. 6, the elongated support member 48 has a curved contour facing the spring assembly 30. When the roller 28 moves from its starting position in the vicinity of the fixed end 30*a* of the spring assembly 30 towards the wedged position in the vicinity of the free end 30*b* of the spring assembly 30, the spring assembly 30 is bent by the roller 28 so that it extends along the curved contour of the elongated support member 48.

Only a single elongated support member 48 extending basically along the full length of the spring assembly 30 is depicted in FIG. 6. In alternative embodiments, which are not explicitly depicted in the figures, the elevator safety device 20 may comprise two or more elongated support members 48, which may be arranged next to each other along the longitudinal extension of the spring assembly 30. Each elongated support member 48 may have a contour, in particular a curved contour, which extends along a portion of the spring assembly 30, respectively.

The elongated support member 48 depicted in FIG. 6 is depicted as having a continuously curved contour. In alternative embodiments, which are not explicitly depicted in the figures, the elongated support member(s) 48 may have a less smooth contour, for example a contour with one or more kinks.

While the disclosure has been described with reference to exemplary embodiments, it will be understood by those skilled in the art that various changes may be made and equivalents may be substituted for elements thereof without departing from the scope of the disclosure. In addition many modifications may be made to adopt a particular situation or material to the teachings of the disclosure without departing from the essential scope thereof. Therefore, it is intended that the disclosure shall not be limited to the particular embodiment disclosed, but that the disclosure includes all embodiments falling within the scope of the dependent claims.

REFERENCES

2 elevator system
3 tension member
4 hoistway
5 elevator drive
7*a* landing control panel
7*b* elevator car control panel
8 landing
11 landing door
12 elevator car door
14 car guide member
15 counterweight guide member
20 elevator safety device
21 elevator counterweight
22 housing
26 first engagement member/break shoe
28 second engagement member/roller
29 collar
30 spring assembly
31 groove
32 leaf spring
34 fixture
36 stopper
40 first support member
42 second support member
44 third support member
48 elongated support member
62 car roof
64 car floor
66 side wall
68 interior space
70 passenger

The invention claimed is:

1. An elevator safety device comprising:
- a housing attachable to an elevator car or to an elevator counterweight of an elevator system, the housing comprising a passage that allows a guide member to pass through;
- a brake shoe attached to the housing and located on a first side of the guide member passing through the passage;
- a spring assembly arranged on a second side of the guide member passing through the passage and comprising at least one leaf spring, the spring assembly having a fixed end, which is fixed to the housing, and an opposite free end, which is not fixed to the housing;
- a roller;
- wherein the spring assembly extends at an angle with respect to the guide member, defining a tapered region between the guide member and the spring assembly, wherein the opposite free end of the spring assembly is arranged closer to the guide member than the fixed end of the spring assembly;
- wherein the roller is, at least in an activated condition of the elevator safety device, located within said tapered region defined by the spring assembly and the guide member;
- wherein the roller is movable along the spring assembly towards the opposite free end of the spring assembly into a wedged condition between the spring assembly and the guide member;
- wherein a portion of the spring assembly adjacent to the opposite free end of the spring assembly is configured for being bent away from the guide member by the roller, when or as the roller moves towards the opposite free end of the spring assembly; and
- a stopper, which is located at a position spaced beyond the opposite free end of the spring assembly in a direction away from the fixed end and outside of the tapered region, and which is configured for preventing the roller from moving beyond the opposite free end of the spring assembly.

2. The elevator safety device according to claim 1, further comprising at least one support member that supports a portion of the spring assembly and/or for limiting a bending of the spring assembly caused by the roller.

3. The elevator safety device according to claim 2,
- comprising a plurality of support members arranged along the spring assembly, and/or
- comprising at least one support member extending over an elongated portion of the spring assembly.

4. The elevator safety device according to claim 3, wherein the at least one support member is an at least partially curved support member.

5. The elevator safety device according to claim 1, further comprising a fixture, which fixes the fixed end of the spring assembly to the housing.

6. The elevator safety device according to claim 5, wherein the fixture is provided by and/or formed integrally with a portion of the housing.

7. The elevator safety device according to claim 5, wherein the fixture accommodates the fixed end of the spring assembly.

8. The elevator safety device according to claim 1, wherein the at least one leaf spring comprises a plurality of leaf springs.

9. The elevator safety device according to claim 8, wherein the plurality of leaf springs are arranged in a sandwich-structure on top of each other forming a stack of leaf springs.

10. The elevator safety device according to claim 1, wherein the spring assembly has a length of not more than 60 mm.

11. The elevator safety device according to claim 10, wherein the spring assembly has a length of 54 mm to 58 mm.

12. The elevator safety device according to claim 1, wherein a groove is formed within a surface of the spring assembly facing the guide member, and wherein a collar is formed on a peripheral surface of the roller, and wherein said collar is received within said groove to guide a movement of the roller along the spring assembly.

13. A method of activating an elevator safety device according to claim 1, wherein the method includes moving the roller towards the guide member so that the roller is sandwiched between the guide member and the spring assembly;

the roller is moved due to frictional engagement with the guide member towards the opposite free end of the at least one leaf spring, when the elevator safety device moves along the guide member; and the roller elastically bends the opposite free end of the at least one leaf spring away from the guide member.

14. The elevator safety device according to claim 1, wherein the stopper is formed by a portion of the housing.

15. The elevator safety device according to claim 1, wherein the roller contacts the stopper only after a contact surface of the roller passes beyond the opposite free end of the spring assembly.

16. The elevator safety device according to claim 1, wherein the stopper is positioned at a distance beyond the opposite free end of the spring assembly measured along a direction of roller travel, the stopper being spaced from the opposite free end such that a gap exists between the opposite free end of the spring assembly and the stopper, whereby the opposite free end of the spring assembly is freely deflectable by the roller prior to the roller contacting the stopper.

17. The elevator safety device according to claim 1, wherein the stopper is mounted to the housing at a location beyond the opposite free end of the spring assembly in the direction away from the fixed end and toward the opposite free end, the stopper being positioned such that the stopper does not overlap with the spring assembly along the direction of roller travel.

18. An elevator car or elevator counterweight comprising:

at least one elevator safety device that comprises:

a housing attachable to the elevator car or to the elevator counterweight of an elevator system, the housing comprising a passage that allows a guide member to pass through;

a brake shoe attached to the housing and located on a first side of the guide member passing through the passage;

a spring assembly arranged on a second side of the guide member passing through the passage and comprising at least one leaf spring, the spring assembly having a fixed end, which is fixed to the housing, and an opposite free end, which is not fixed to the housing;

a roller;

wherein the spring assembly extends at an angle with respect to the guide member, defining a tapered region between the guide member and the spring assembly, wherein the opposite free end of the spring assembly is arranged closer to the guide member than the fixed end of the spring assembly;

wherein the roller is, at least in an activated condition of the at least one elevator safety device, located within said tapered region defined by the spring assembly and the guide member;

wherein the roller is movable along the spring assembly towards the opposite free end of the spring assembly into a wedged condition between the spring assembly and the guide member;

wherein a portion of the spring assembly adjacent to the opposite free end of the spring assembly is configured for being bent away from the guide member by the roller, when or as the roller moves towards the opposite free end of the spring assembly; and a stopper, which is located at a position spaced beyond the opposite free end of the spring assembly in a direction away from the fixed end and outside of the tapered region, and which is configured for preventing the roller from moving beyond the opposite free end of the spring assembly.

19. The elevator car or elevator counterweight according to claim 18, wherein:

the at least one elevator safety device comprises a first elevator safety device and a second elevator safety device;

wherein, for the first elevator safety device, the fixed end of the spring assembly is a lower end of the spring assembly facing towards a floor of a hoistway, and wherein the opposite free end of the spring assembly is an upper end of the spring assembly facing towards an upper end of the hoistway; and wherein, for the second elevator safety device, the opposite free end of the spring assembly is a lower end of the spring assembly facing towards the floor of the hoistway, and wherein the fixed end of the spring assembly is an upper end of the spring assembly facing towards an upper end of the hoistway.

20. An elevator system comprising:

an elevator car, which is movable along a guide member between a plurality of landings; and wherein the elevator car is an elevator car according to claim 18.

21. The elevator system according to claim 20 further comprising an elevator counterweight, which moves concurrently and in an opposite direction with respect to the elevator car.

22. The elevator car or elevator counterweight according to claim 18, wherein:

the roller contacts the stopper only after a contact surface of the roller passes beyond the opposite free end of the spring assembly; and/or the stopper is positioned at a distance beyond the opposite free end of the spring assembly measured along a direction of roller travel, the stopper being spaced from the opposite free end such that a gap exists between the opposite free end of the spring assembly and the stopper, whereby the opposite free end of the spring assembly is freely deflectable by the roller prior to the roller contacting the stopper.

* * * * *